Nov. 25, 1947.    F. BUDRECK ET AL    2,431,458
CAP FOR GASOLINE TANK FILLER PIPE
Filed Oct. 3, 1945    2 Sheets-Sheet 1
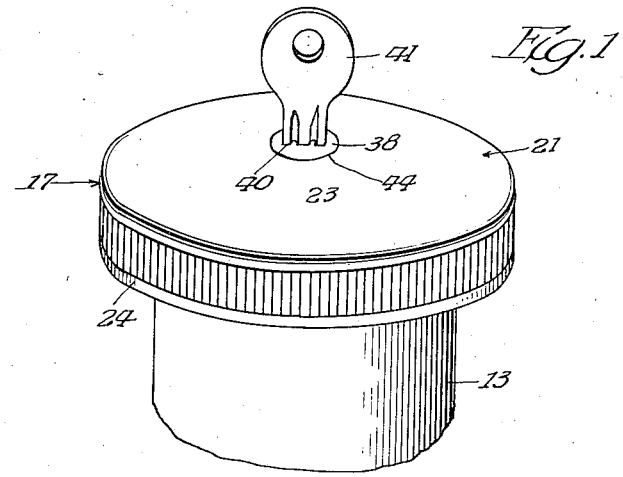
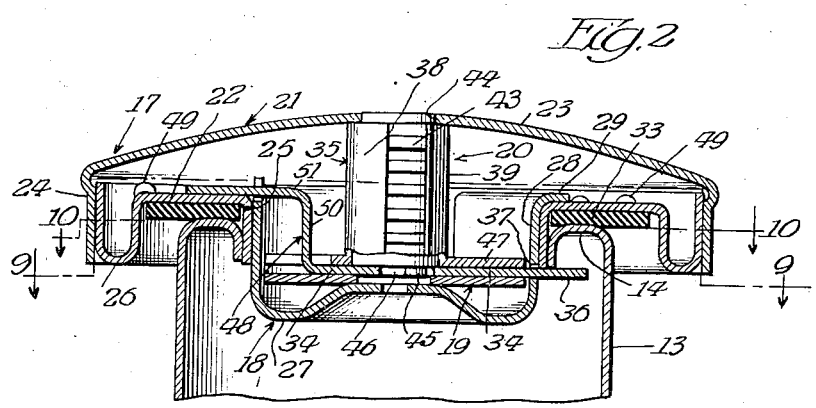
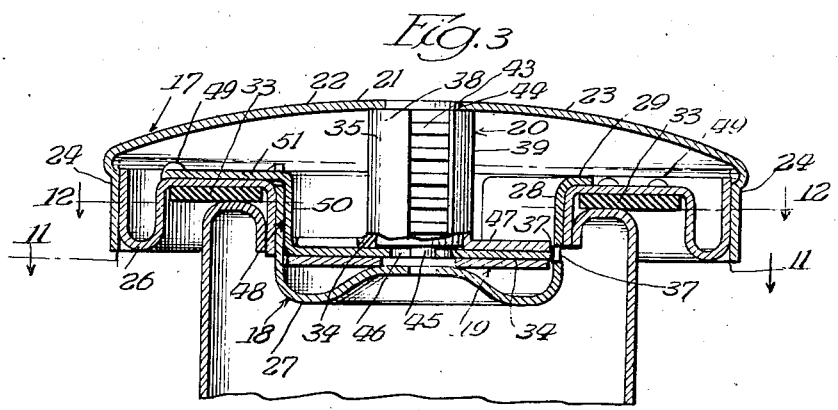
Inventors
Frances Budreck
& Benjamin Jelinek

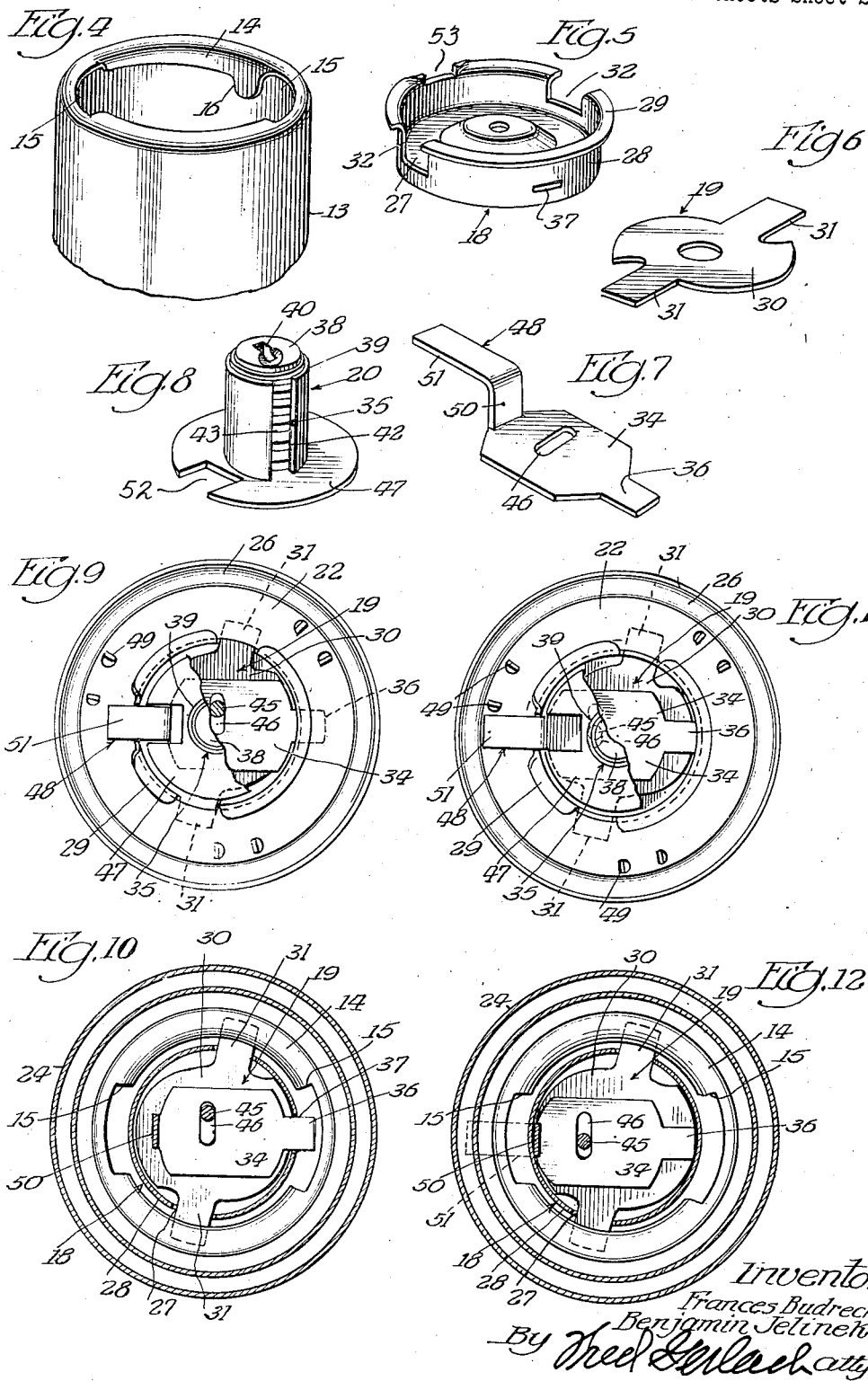

Patented Nov. 25, 1947

2,431,458

UNITED STATES PATENT OFFICE 2,431,458

CAP FOR GASOLINE TANK FILLER PIPE

Frances Budreck, Chicago, and Benjamin Jelinek, La Grange, Ill., assignors to Monarch Tool & Machinery Co., Chicago, Ill., a corporation of Illinois Application October 3, 1945, Serial No. 620,068

7 Claims. (Cl. 70—172)

The present invention relates generally to caps for closing the filler pipes of automobile gasoline tanks or the like. More particularly the invention relates to that type of filler pipe cap which, as its component or principal parts, comprises: (1) a disc-like body; (2) a carrier element which is centrally disposed on the under side of the body and is mounted for rotation relatively to the body about the axis of the latter; (3) an attaching member which is connected fixedly to the carrier element and has a pair of oppositely positioned outwardly extending fingers that are adapted in connection with application of the cap to the filler pipe first to pass through diametrically opposite notches in an inwardly extending annular flange on the inlet end of the filler pipe and then in response to limited turning or rotation of the cap to swing under the flange and thus secure the cap in connected relation with the filler pipe; (4) key controlled locking means including a lock bolt which is slidably mounted with respect to the carrier element and is adapted when the body is held in place by the fingers of the attaching member to be shifted by the key back and forth between a locked position wherein one end thereof is in interlocked or interfitting relation with one of the finger receiving notches in the inwardly extending flange on the inlet end of the filler pipe and an unlocked position wherein its said one end is out of interlocking relation with the one notch; and (5) means whereby when the locking bolt is in its unlocked position the carrier element is held against free rotation relatively to the body to the end that the cap as a whole may by turning movement be applied to, or removed from, the filler pipe and when the locking bolt is in its locked position releases the carrier element so that the body is free to rotate or spin relatively thereto and hence when the cap is in its operative position may not be utilized to turn the finger equipped attaching member out of connected relation with the inwardly extending flange on the filler pipe.

One object of the invention is to provide a cap of the aforementioned type which is an improvement upon and has certain advantages over previously designed caps of the same general character and is characterized by the fact that it is essentially simple in design and construction and embodies a novel arrangement of parts.

Another object of the invention is to provide a filler pipe cap of the type and character under consideration in which the body comprises an inverted cup shaped shell and a crosswall within the shell and in spaced relation with the top wall of the shell and the means for preventing free rotation of the carrier element relatively to the body when the locking bolt is in its unlocked position, consists of an arm which is connected to, and slidable with, the locking bolt and is adapted when the bolt is shifted into its unlocked position by the key of the key controlled locking means to slide into interlocked relation with stop forming lugs on the crosswall of the body and thereby lock the body and carrier element against free relative rotation.

Another object of the invention is to provide a filler pipe cap of the type under consideration in which the carrier element is cup shaped so far as shape or configuration is concerned, has the upper end of its annular side wall rotatably mounted in a circular hole in the central portion of the cross wall of the body and has the locking bolt and the finger equipped attaching member mounted one above the other in the bottom portion thereof.

A further object of the invention is to provide a filler pipe cap of the aforementioned type and character in which the key controlled locking means comprises a rotatable tumbler equipped plug and in addition a cylindrical barrel which surrounds the plug, extends from the central portion of the top wall of the shell of the body downwards into the central portion of the cup-shaped carrier element and is so proportioned and arranged as to hold the locking bolt and the finger equipped attaching member against upward displacement with respect to the carrier element.

A still further object of the invention is to provide a filler pipe cap which is generally of new and improved construction and is capable of being manufactured at a low and reasonable cost.

Other objects of the invention and the various advantages and characterisitics of the present cap will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a perspective showing a cap embodying the invention applied to the inlet end of a filler pipe for an automobile gasoline tank;

Figure 2 is an enlarged vertical section showing the cap in its operative and locked position and illustrating in detail the manner in which the various component parts of the cap are constructed and arranged;

Figure 3 is an enlarged vertical section showing the cap with the lock bolt in its unlocked position;

Figure 4 is a fragmentary perspective of the inlet end of the filler pipe to which the cap is adapted to be applied;

Figure 5 is a perspective of the rotatable carrier element which is centrally positioned on the under side of the body of the cap;

Figure 6 is a perspective of the finger equipped attaching member for releasably holding the cap in connected relation with the inlet end of the filler pipe;

Figure 7 is a perspective of the locking bolt which forms a part of the key controlled locking means for locking the cap in its operative position and includes the arm which together with the stop forming lugs on the crosswall of the body serves to lock the rotatable carrier against rotation relatively to the body when the locking bolt is in its unlocked position;

Figure 8 is a perspective of the assembly of tumbler equipped plug and cylindrical barrel forming part of the key controlled locking means;

Figure 9 is a horizontal section taken on the line 9—9 of Figure 2;

Figure 10 is a horizontal section taken on the line 10—10 of Figure 2; and

Figures 11 and 12 are horizontal sections taken, respectively, on the lines 11—11 and 12—12 of Figure 3, and showing the locking bolt in its unlocked position wherein the arm on the bolt is disposed in the path of the stop forming lugs on the crosswall of the body and coacts with one of the lugs to prevent free relative rotation of the body and carrier element.

The cap which is shown in the drawings constitutes the preferred form or embodiment of the invention and serves as a medium for closing the filler pipe of an automobile gasoline tank or like container. The filler pipe is designated in the drawings by the reference numeral 13 and embodies at its upper or inlet end an internal annular flange 14, the outer portion of which extends at right angles to the pipe and the inner portion of which extends downwards. As shown in Figure 4, the flange 14 of the filler pipe is provided with a pair of diametrically opposite notches 15, and the parts of the inner portion of the downwardly extending inner portion of the flange that extend between the notches have the bottom edges downwardly inclined in a clockwise direction and embody at the lower ends of such edges integral depending abutments 16. The cap comprises a disc-like body 17, a cup shaped carrier element 18, an attaching member 19, and key controlled locking means 20.

The body 17 consists of an inverted cup-shaped shell 21 and a crosswall 22 within the shell. Such shell is in the form of a sheet metal stamping and consists of a circular concavo-convex top wall 23 and an integral annular depending skirt 24. The central or intermediate portion of the skirt is knurled as shown in Figure 1, in order that the body of the cap may be readily gripped and turned in connection with application to, and removal from, the filler pipe 13. The crosswall 22, like the shell 21, is in the form of a sheet metal stamping. It is located beneath and in spaced relation with the top wall 23 of the shell, has a circular hole 25 in its central portion and embodies on the outer margin thereof an integral annular depending U-shaped flange 26. The hole 25 is arranged in truly concentric relation with the center of the concavo-convex top wall 23 of the shell 21. The outer portion of the U-shaped flange 26 fits within the skirt 24 of the shell and is fixedly secured thereto either by a press or drive fit or by spot welding. When the cap is in its operative position the skirt 24 and the flange 26 surround the inlet end of the filler pipe 13, as shown in Figures 2 and 3. The diameter of the inner portion of the flange 26 is slightly greater than the diameter of the inlet end of the filler pipe in order that the cap when mounted on the filler pipe may be readily turned.

The cup-shaped carrier element 18 is preferably formed of stamped sheet metal. It is located within the central portion of the cap body 17 and comprises a circular bottom wall 27 and an integral upstanding cylindrical side wall 28. The upper end of the side wall 28 corresponds in diameter to, and is rotatably mounted in, the circular hole 25 in the central portion of the crosswall 22 and embodies an integral outwardly extending flange 29 which overlies the hole defining portion of the crosswall and serves to prevent downward displacement of the carrier element 18 with respect to the cap body 17.

The attaching member 19, like the cap parts heretofore described, is in the form of a sheet metal stamping. It consists of a flat intermediate part 30 and a pair of coplanar, oppositely positioned, outwardly extending fingers 31, and serves as a medium for releasably securing the cap in its operative position wherein, as shown in Figures 1 to 3, inclusive, the body 17 overlies and extends across the inlet end of the filler pipe 13. The flat intermediate part 30 of the attaching member 19 fits snugly within the cylindrical side wall 28 of the carrier element 18 and rests on the bottom wall 27 of the carrier element. The fingers 31 extend through and project beyond a pair of diametrically opposite notches 32 in the side wall 28 of the carrier element, as shown in the drawings. In applying the cap to the filler pipe 13 the body 17 is placed over the inlet end of the pipe and is then manipulated so as to bring the outer ends of the fingers 31 into registry with the notches 15 in the filler pipe flange 14. Thereafter the body is shifted downwards and then partially turned or rotated so as to bring the outer ends of the fingers into a position wherein they underlie the inclined bottom edges of the parts of the downwardly extending portion of the flange 14 that are disposed between the notches 15. When the fingers are in such position they serve to hold the cap in its operative position wherein it is in connected and sealed relation with the inlet end of the filler pipe. To remove the cap it is only necessary to turn or rotate it reversely until the fingers 31 of the attaching member 19 are in alignment with the notches 15. As soon as the fingers and notches are in alignment the cap may be removed by lifting it from the inlet end of the filler pipe. As hereinafter described the rotatably mounted carrier element 18 is held against free turning relatively to the body 17 during manipulation of the cap into and out of its operative position. A ring shaped gasket 33 of cork or other compressible material surrounds the upper end of the cylindrical side wall 28 of the carrier element 18 and underlies the crosswall 22 of the cap body 17. This gasket serves as a sealing medium and is clamped between the cross wall 22 and the outer portion of the flange 14 when the cap is in its operative position. The fingers 31 of the attaching member 19 underlie the gasket and operate to hold the latter in place around the cylindrical side wall of the carrier element 18.

The key controlled locking means 20 serves to lock the cap in its operative position and comprises a lock bolt 34 and a plug and barrel assembly 35. The lock bolt 34 is formed of stamped sheet metal and rests on the flat intermediate part 30 of the attaching member 19. It is longitudinally and horizontally slidable relatively to the carrier element 18 and embodies at one end thereof a dog 36 which extends through, and is slidably mounted in, a circumferential slot 37 in the cylindrical upstanding side wall 28 of the cup-shaped carrier element 18. The slot 37 is disposed between the notches 32 and is so located or positioned that it is in registry with one of the notches 15 in the filler pipe flange 14 when the cap is in its operative position. When the cap is in its operative position and the lock bolt 34 is shifted outwards, as shown in Figures 9 and 10, so as to project the dog 36 beyond the circumferential slot 37 and into the adjacent notch 15 the dog locks the carrier element against rotation relatively to the filler pipe and hence prevents removal of the cap. When the lock bolt is shifted inwards so as to effect withdrawal of the dog 36 from the adjacent or opposite notch 15 the carrier element 18 is released so far as turning movement relatively to the filler pipe is concerned and hence it is possible by reverse rotative movement of the body to remove the cap from the filler pipe. The plug and barrel assembly 35 of the key controlled locking means 20 is centrally disposed in the space between the central portion of the top wall 23 of the cap shell 21 and the central portion of the locking bolt 34 and consists of a cylindrical plug 38 and a barrel 39. The plug and barrel extend vertically, as shown in Figures 2 and 3. The plug is rotatably mounted in the barrel 39 and has a longitudinal key slot 40 for a key 41. It also has a longitudinal series of spring actuated plate tumblers 42 and these are mounted for transverse sliding movement relatively to the plug and are adapted when the key 41 is inserted into the key slot 40 to be shifted into a position wherein the ends thereof are flush with the outer periphery of the plug and when the key is removed from the key slot to be shifted by the springs that are associated therewith into a position wherein certain ends thereof are disposed in either of a pair of diametrically opposite, longitudinally extending slots 43 in the barrel 39. The upper end of the plug 38 registers with a circuit hole 44 in the central portion of the concavo-convex top wall 23 of the shell 21 in order that the upper end of the key slot 40 is accessible from the outside of the cap body 17. The plug 38 is adapted when the key 41 is inserted into the key slot 40 to rotate in connection with turning of the key back and forth throughout an arc of 180°. The lower end of the plug is provided with a depending eccentrically disposed stud 45 and this is disposed within a transversely extending cam slot 46 in the central portion of the lock bolt 34 and forms an operative connection whereby the lock bolt is slid into and out of its locked position in response to back and forth turning of the plug 38 by way of the key 41. The stud is so arranged that when said certain ends of the tumblers are in alignment or registry with one of the slots 43 in the barrel 39 it maintains the lock bolt in its locked position and when the plug is rotated by the key throughout an arc of 180° into a position wherein said certain ends of the tumblers are in alignment with the other slot 43 it slides the bolt into its retracted or unlocked position. The key 40 may be removed from the plug when the lock bolt is in either its locked or unlocked position. The upper end of the barrel 39 of the plug and barrel assembly 35 abuts against the central portion of the top wall 23 of the shell 21 and the lower end of the barrel is provided with a transversely extending ring shaped plate 47 which overlies and rests upon the upper surface of the lock bolt 34. The barrel is so proportioned so far as length is concerned that it, together with the plate 47, serves to hold the lock bolt 34 and the attaching member 19 against upward displacement with respect to the rotatable carrier element 18.

In addition to the parts heretofore mentioned the cap comprises means whereby when the lock bolt is in its unlocked position the carrier element is held against free rotation relatively to the body to the end that the cap as a whole may be applied to or removed from the inlet end of the filler pipe and when the lock bolt is in its locked position the body and carrier element are released for free relative rotation and hence when the cap is in its operative position the body may not be utilized to turn the finger equipped attaching member 19 out of connected relation with the inwardly extending flange 14 of the filler pipe 13. Such means comprises an arm 48 on the lock bolt 34 and an annular series of pairs of up-struck stop-forming lugs 49 on the cross-wall 22 of the cap body 17. The arm 48 is L-shaped and consists of a vertically extending part 50 and a horizontally extending part 51. The lower end of the vertically extending part 50 of the arm 48 fits slidably in a notch 52 in the ring shaped plate 47 at the lower end of the barrel 39 and is formed integrally with the end of the lock bolt that is opposite the dog 36. The horizontally extending part 51 of the arm is formed integrally with, and projects outwards from, the upper end of the arm-part 50, extends through a notch 53 in the outwardly extending annular flange 29 at the upper end of the cylindrical side wall 28 of the cup shaped carrier element 18, and rests upon, and fits slidably against, the upper face of the crosswall 22 of the cap body 17. The pairs of up-struck stop-forming lugs 49 are preferably three in number and are located adjacent the outer marginal portion of the crosswall 22. The length of the horizontally extending part 51 of the arm 48 is such that when the lock bolt is in its unlocked position the outer end of the part 50 is located in the path of the lugs 49 and when the lock bolt is in its locked position the outer end of the part 50 is disposed inwards of the path of the lugs. When the lock bolt is in its unlocked position the body 17 of the cap may be turned relatively to the carrier element until one of the lugs 49 strikes against the outer end of the horizontally extending part 51 of the arm 48. At such time the lug coacts with the arm 48 so as to prevent further relative rotation of the body with respect to the carrier element and thus the two are locked together in such manner that the cap may be applied to, or removed from, the filler pipe in connection with turning or rotation of the body. When, after application of the cap to the filler pipe, the lock bolt 34 by proper manipulation of the key 41 is shifted into its locked position the outer end of the horizontally extending part 51 of the arm 48 is disposed inwards of the path of the lugs 49, as previously pointed out, and hence the body 17 is permitted to turn or spin freely relatively to the carrier element 18 and hence cannot be utilized to disconnect the finger equipped attaching member 19 from the inwardly extending flange 14 at the upper or inlet end of the filler pipe 13. The arm 48 and the lugs 49 constitute or exemplify simple means whereby the body and carrier element are locked against free relative rotation when the lock bolt is in unlocked position and are released for free relative rotation or turning when the lock bolt is in its locked position.

When it is desired to apply the cap to the filler pipe the key 41 is inserted into the key slot 40 in the rotatable tumbler equipped plug 38 and is turned until such time as the lock bolt is shifted into its unlocked position. As soon as the lock bolt is in its unlocked position the horizontally extending part 51 of the arm 48 coacts with one of the stop-forming lugs 49 to prevent free relative turning or rotation of the body 17 and the carrier element 18. After shift of the lock bolt into its unlocked position the cap is manipulated into place by placing the body over the inlet end of the filler pipe and then after insertion of the fingers 31 of the attaching member 19 through the notches 15 turning the cap in a clockwise direction so as to bring the outer ends of the fingers 31 under the inner downwardly extending portion of the flange 14. When the cap is turned to its fullest extent the gasket 33 is compressed between the crosswall 22 and the horizontally extending outer portion of the flange 14 and the circumferential slot 37 in the cylindrical side wall 28 of the carrier element 18 is in alignment or registry with one of the notches 15. After shift or manipulation of the cap into place the key 41 is turned throughout an arc of 180° in order to effect shift of the lock bolt 34 into its locked position wherein the dog 36 is in interlocked relation with the adjacent notch 15. After so turning the key the key is removed. As heretofore pointed out, shift of the lock bolt into its locked position results in inward shift of the horizontally extending part 51 of the arm 40 from the path of the stop-forming lugs 49 and results in the body 17 of the cap being free to turn or spin relatively to the carrier element 18. Hence, when the cap is in place while the lock bolt 34 is in its locked position the cap may not be removed from the filler pipe because of free turning of the body without attendant or corresponding angular displacement of the carrier element 18. When it is desired to remove the cap the key 41 is inserted into the key slot 40 in the plug of the plug and barrel assembly and is then turned so as to effect shift of the lock bolt 34 into its unlocked position. When the lock bolt is so shifted the body and carrier element are held against free relative turning movement or rotation, as previously pointed out, and it is possible by turning the body in a counterclockwise direction to rotate the attaching member 19 so as to bring the fingers 31 into registry with the notches 15 in the flange 14 at the upper end of the filler pipe 13. As soon as the fingers 31 are in registry with the notches 15 the cap may be removed by shifting it upwards.

The herein described cap effectively and efficiently fulfills its intended purpose and may be manufactured at an extremely low and reasonable cost due to the specific design and construction of the parts thereof. By reason of the fact that the cap includes the arm 48 and the stop-forming lugs 49 it is impossible to remove the cap when the lock bolt is in its locked position, except by use of the key 41.

The invention is not to be understood as restricted to the details set forth since these may be modified within the scope of the appended claims without departing from the spirit and scope of the invention.

Having thus described the invention what we claim as new and desire to secure by Letters Patent is:

1. As a new article of manufacture, a cap designed for use as a closure for a filler pipe with a notched inwardly extending flange at its inlet end, and comprising an inverted cup shaped body adapted to fit over, and to be turned relatively to, the inlet end of the pipe, a carrier element mounted rotatably within the interior of the body and having connected thereto an outwardly extending finger adapted, when the body and element are held against relative rotation and the body is fitted over said inlet end of the pipe and then turned, to pass through the notch in the flange and then swing under said flange into an operative position wherein it serves to secure the body in place, a key controlled lock bolt mounted on the carrier element to slide transversely thereof and adapted, when the body is held in place with respect to said inlet end of the filler pipe by the finger, to be shifted back and forth between a locked position wherein a part thereof is disposed in interlocking relation with the notch and an unlocked position wherein such part is free from the notch, and means whereby when the lock bolt is in its unlocked position the body and carrier element are held against free relative rotation and when the lock bolt is in its locked position the body and carrier element are released for free relative rotation.

2. As a new article of manufacture, a cap designed for use as a closure for a filler pipe with a notched inwardly extending flange at its inlet end, and comprising an inverted cup shaped body adapted to fit over, and to be turned relatively to, the inlet end of the pipe, a carrier element mounted rotatably within the interior of the body and having connected thereto an outwardly extending finger adapted, when the body and element are held against relative rotation and the body is fitted over said inlet end of the pipe and then turned, to pass through the notch in the flange and then swing under said flange into an operative position wherein it serves to secure the body in place, a key controlled lock bolt mounted on the carrier element to slide transversely thereof and adapted, when the body is held in place with respect to said inlet end of the filler pipe by the finger, to be shifted back and forth between a locked position wherein a part thereof is disposed in interlocking relation with the notch and an unlocked position wherein such part is free from the notch, and means whereby when the lock bolt is in its unlocked position the body and carrier element are held against free relative rotation and when the lock bolt is in its locked position the body and carrier element are released for free relative rotation, including a member connected to, and shiftable with, said lock bolt.

3. As a new article of manufacture, a cap designed for use as a closure for a filler pipe with a notched inwardly extending flange at its inlet end, and comprising a body consisting of an inverted cup shaped shell and a crosswall within the shell, adapted to fit over, and to be turned relatively to, the inlet end of the pipe, a carrier element connected rotatably to, and depending from, the central portion of the crosswall of the body and having connected to the lower portion thereof an outwardly extending finger adapted, when the body and element are held against relative rotation and the body is fitted over said inlet end of the pipe and then turned, to pass through the notch in the flange and then swing under said flange into an operative position wherein it serves to secure the body in place, a key controlled lock bolt mounted on said lower portion of the carrier element to slide transversely thereof and adapted, when the body is held in place with respect to said inlet end of the filler pipe by the finger, to be shifted back and forth between a locked position wherein a part thereof is disposed in interlocking relation with the notch and an unlocked position wherein such part is free from the notch, and means whereby when the lock bolt is in its unlocked position the body and carrier element are held against free relative rotation and when the lock bolt is in its locked position the body and carrier element are released for free relative rotation, consisting of an annular series of stop forming lugs on the crosswall and an arm connected to, and shiftable with, the lock bolt and arranged so that when the lock bolt is shifted into its unlocked position it is disposed in the path of the lugs and when the lock bolt is shifted into its locked position it is disposed out of the path of said lugs.

4. As a new article of manufacture, a cap designed for use as a closure for a filler pipe with a notched inwardly extending flange at its inner end, and comprising a body consisting of an inverted cup shaped shell, a crosswall within the shell and adapted to fit over, and be turned relatively to, the inlet end of the pipe, a cup shaped carrier element connected rotatably to, and depending from, the central portion of the crosswall of the body and having fixedly associated with the lower portion thereof an outwardly extending finger adapted, when the body and carrier element are held against relative rotation and the body is fitted over said inlet end of the pipe and then turned, to pass through the notch in the flange and then swing under said flange into an operative position wherein it serves to secure the body in place, an elongated key controlled lock bolt mounted in said lower portion of the carrier element to slide transversely thereof and adapted, when the body is held in place with respect to said inlet end of the filler pipe by the finger, to be shifted back and forth between a locked position wherein one end thereof is disposed in interlocking relation with the notch and an unlocked position wherein said one end is free from the notch, and means whereby when the lock bolt is in its unlocked position the body and carrier element are held against free relative rotation and when the lock bolt is in its locked position the body and carrier element are released for free rotation, consisting of an annular series of upstanding stop forming lugs on the crosswall and an L-shaped arm connected to, and shiftable with, the lock bolt, having an upstanding inner part and an outwardly extending outer part in overlying relation with the cross-wall, and arranged so that when the lock bolt is shifted into its unlocked position the outer part thereof is disposed in the path of the lugs and when the lock bolt is shifted into its locked position said outer part thereof is disposed out of the path of said lugs.

5. As a new article of manufacture, a cap designed for use as a closure for a filler pipe with a notched inwardly extending flange at its inner end, and comprising a body consisting of an inverted cup shaped shell, a crosswall within the shell and adapted to fit over, and be turned relatively to, the inlet end of the pipe, a cup shaped carrier element connected rotatably to, and depending from, the central portion of the crosswall of the body and having fixedly associated with the lower portion thereof an outwardly extending finger adapted, when the body and carrier element are held against relative rotation and the body is fitted over said inlet end of the pipe and then turned, to pass through the notch in the flange and then swing under said flange into an operative position wherein it serves to secure the body in place, an elongated lock bolt mounted in said lower portion of the carrier element to slide transversely thereof and adapted, when the body is held in place with respect to said inlet end of the filler pipe by the finger, to be shifted back and forth between a locked position wherein a part thereof is disposed in interlocking relation with the notch and an unlocked position wherein said part is free from the notch, a key controlled lock device for shifting the lock bolt back and forth between its locked and unlocked positions in an upstanding position in the central portion of the body and embodying a cylindrical barrel having the upper end thereof in abutment with the central portion of the top wall of the shell and its lower end in sliding engagement with the upper face of the lock bolt and serving to hold the lock bolt against upward displacement with respect to the carrier element, and a tumbler equipped plug mounted rotatably in the barrel and having the lower end thereof operatively connected to said lock bolt, and means whereby when the lock bolt is in its unlocked position the body and carrier element are held against free relative rotation and when the lock bolt is in its locked position the body and carrier element are released for free rotation, consisting of an annular series of stop forming lugs on the crosswall and an arm connected to, and shiftable with, the lock bolt and arranged so that when the lock bolt is shifted into its unlocked position it is disposed in the path of the lugs and when the lock bolt is shifted into its locked position it is disposed out of the path of said lugs.

6. As a new article of manufacture, a cap designed for use as a closure for a filler pipe with a notched inwardly extending flange at its inner end, and comprising a body consisting of an inverted cup shaped shell, a crosswall within the shell and adapted to fit over, and be turned relatively to, the inlet end of the pipe, a cup shaped carrier element connected rotatably to, and depending from the central portion of the crosswall of the body and having fixedly associated with the lower portion thereof an outwardly extending finger adapted, when the body and carrier element are held against relative rotation and the body is fitted over said inlet end of the pipe and then turned, to pass through the notch in the flange and then swing under said flange into an operative position wherein it serves to secure the body in place, an elongated key controlled lock bolt mounted in said lower portion of the carrier element to slide transversely thereof and adapted, when the body is held in place with respect to said inlet end of the filler pipe by the finger, to be shifted back and forth between a locked position wherein one end thereof is disposed in interlocking relation with the notch and an unlocked position wherein said one end is free from the notch, a key controlled lock device for shifting the lock bolt back and forth between its locked positions in an upstanding position in the central portion of the body and embodying a cylindrical barrel having the upper end thereof in abutment with the central portion of the top wall of the shell and its lower end in sliding engagement with the upper face of the lock bolt and serving to hold the lock bolt against upward displacement with respect to the carrier element, and a tumbler equipped plug mounted rotatably in the barrel and having the lower end thereof operatively connected to said lock bolt, and means whereby when the lock bolt is in its unlocked position the body and carrier element are held against free relative rotation and when the lock bolt is in its locked position the body and carrier element are released for free rotation, consisting of an annular series of upstanding stop forming lugs on the crosswall and an L-shaped arm connected to, and shiftable with, the lock bolt, having an upstanding inner part and an outwardly extending outer part in overlying relation with the crosswall, and arranged so that when the lock bolt is shifted into its unlocked position the outer part thereof is disposed in the path of the lugs and when the lock bolt is shifted into its locked position said outer part thereof is disposed out of the path of said lugs.

7. A locking device for use with a cap for a filler pipe having a notched inwardly extending flange at its inlet end, the cap comprising a body consisting of an inverted cup shaped shell and a crosswall disposed within and extending across the shell, spaced from the top wall of the shell and having a circular hole in its central portion, said locking device comprising a cup shaped carrier element disposed centrally within the body, having the upper end of the side wall thereof connected to the hole defining portion of the crosswall, and provided in said side wall with a notch and a circumferential slot at one side of the notch, a plate like attaching member resting directly on the bottom wall of the carrier element and embodying an outwardly extending finger projecting through the notch in the side wall of the carrier element and adapted, when the body is fitted onto the inlet end of the pipe and then turned, to pass first through the notch in the inwardly extending flange and then to swing under the flange into an operative position wherein it serves to secure the body in place, an elongated lock bolt mounted in the lower portion of the carrier element directly on top of the attaching member, arranged to slide transversely of the carrier element and adapted, when the body is held in place with respect to said inlet end of the filler pipe by the finger, to be shifted back and forth between a locked position wherein one end thereof projects through the slot and is disposed in interlocked relation with the notch in the flange and an unlocked position wherein said end is free from the last mentioned notch, and an upstanding key controlled lock unit for shifting the lock bolt back and forth between its locked and unlocked positions, disposed centrally within the body and embodying a cylindrical barrel having the upper end thereof in abutment with the central portion of the top wall of the shell and its lower end extending into the carrier element and in sliding engagement with the upper surface of the lock bolt and a tumbler equipped plug rotatably mounted in the barrel and having the lower end thereof operatively connected to the lock bolt.

FRANCES BUDRECK.
BEN JELINEK.

REFERENCES CITED

The following references are of record in the file of this patent:

UNITED STATES PATENTS

| Number | Name | Date |
|---|---|---|
| 1,903,892 | Carney | Apr. 18, 1933 |
| 1,924,308 | Cruze | Aug. 29, 1933 |
| 2,003,046 | Halkett | May 28, 1935 |
| 2,163,042 | Klemm, Jr. | June 20, 1939 |
| 2,391,498 | Wise | Dec. 25, 1945 |